(12) United States Patent
Nimberger

(10) Patent No.: US 6,182,701 B1
(45) Date of Patent: Feb. 6, 2001

(54) SWIVEL-TYPE STATIC PRESSURE BAR ADAPTER

(75) Inventor: Spencer M. Nimberger, Houston, TX (US)

(73) Assignee: PGI International, Ltd., Houston, TX (US)

(*) Notice: Under 35 U.S.C. 154(b), the term of this patent shall be extended for 0 days.

(21) Appl. No.: 08/704,383

(22) Filed: Aug. 21, 1996

Related U.S. Application Data

(60) Provisional application No. 60/005,231, filed on Oct. 10, 1995.

(51) Int. Cl.[7] ........................................... F16K 11/10
(52) U.S. Cl. ........................ 137/884; 137/597; 251/148
(58) Field of Search ..................... 251/148; 137/884, 137/597, 557, 315

(56) References Cited

U.S. PATENT DOCUMENTS

| | | | |
|---|---|---|---|
| 4,726,399 | * | 2/1988 | Miller ................................... 137/884 |
| 4,920,626 | * | 5/1990 | Nimberger ............................ 137/884 |
| 5,209,258 | * | 5/1993 | Sharp et al. .......................... 137/597 |
| 5,277,224 | | 1/1994 | Hutton et al. ......................... 137/597 |

* cited by examiner

Primary Examiner—A. Michael Chambers
(74) Attorney, Agent, or Firm—Jenkens & Gilchrist; John R. Kirk, Jr.

(57) ABSTRACT

An adapter arranged for interposition between a manifold and a first test instrument and detachably supporting a second test instrument in a selected angular orientation includes a stationary bar and a rotatable body attached to the stationary bar that has a mounting surface arranged to detachably support the second test instrument. The adapter also includes a means for securing the rotatable body in a selected angular relationship with respect to the stationary bar and providing a stabilized sealed connection between the rotatable body and the stationary bar.

12 Claims, 3 Drawing Sheets

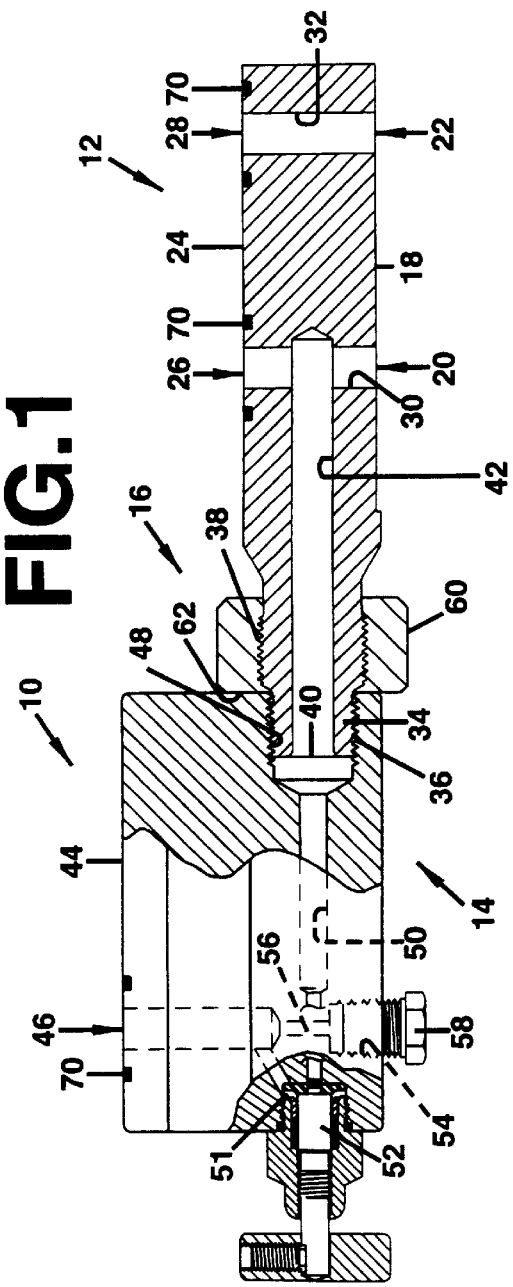
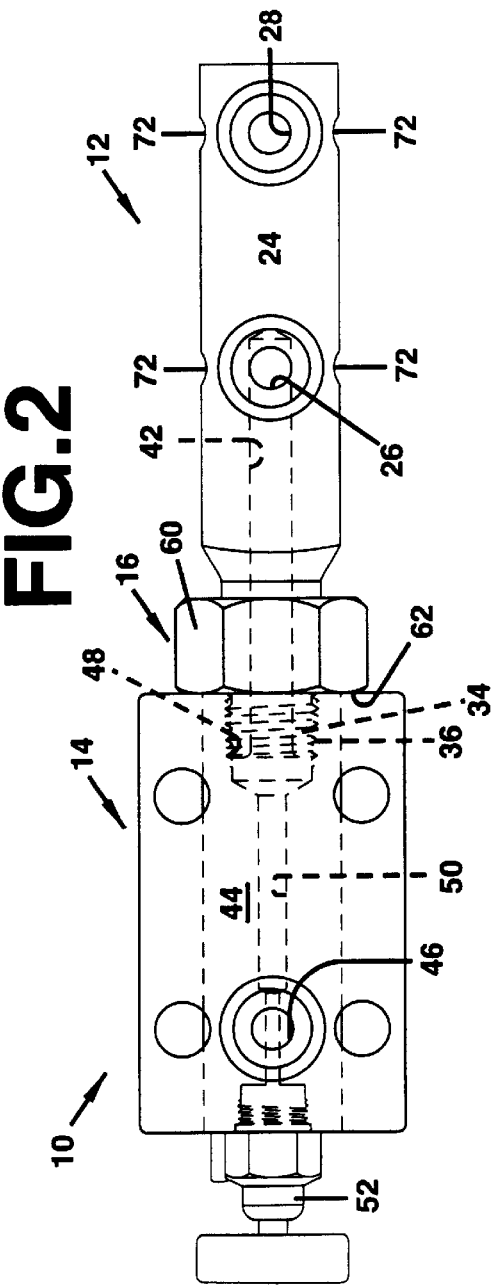

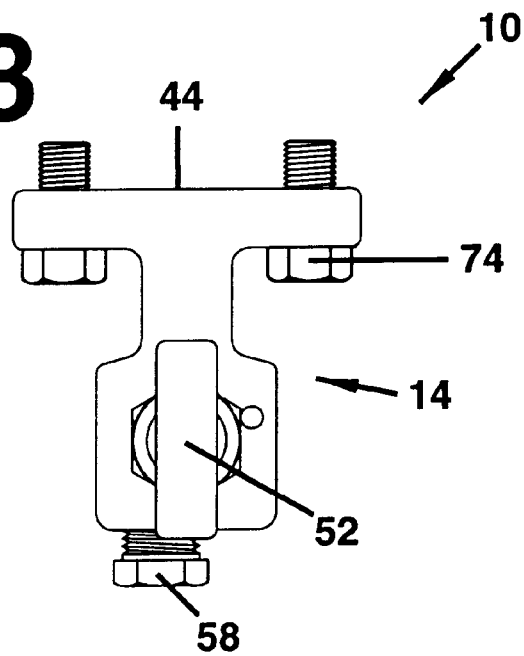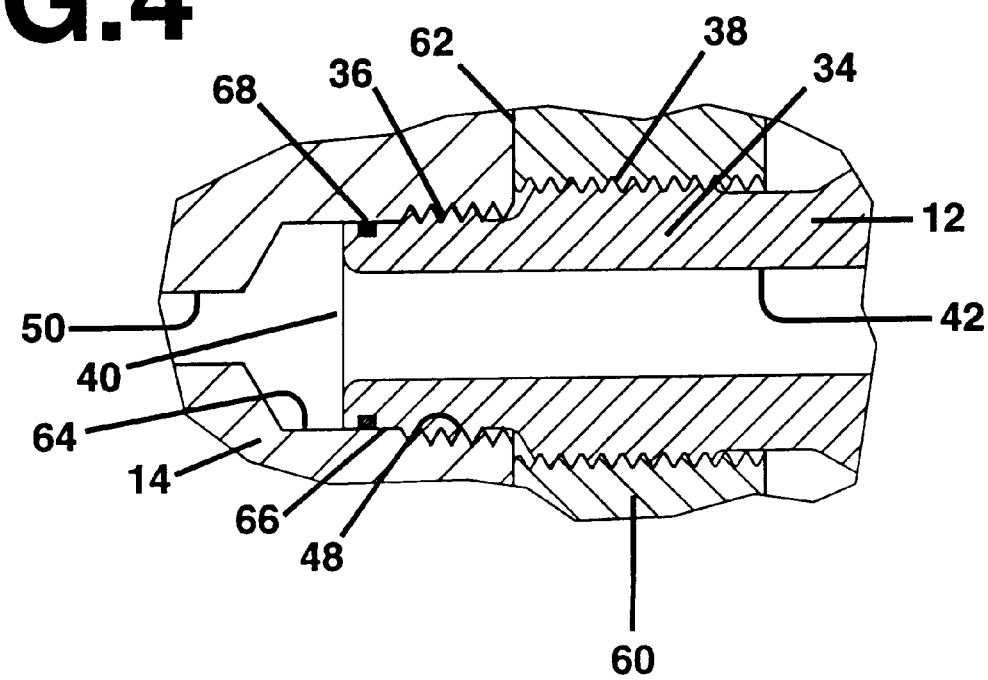

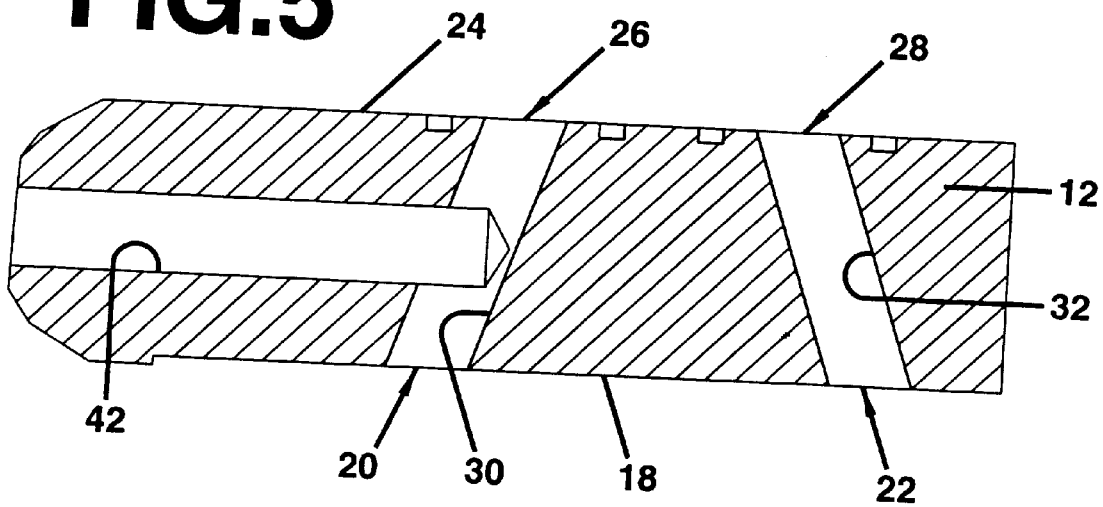

SWIVEL-TYPE STATIC PRESSURE BAR ADAPTER

This application claims priority of provisional patent application Ser. No. 60/005,231, filed Oct. 10, 1995.

BACKGROUND OF THE INVENTION

1. Field of the Invention

This invention relates generally to adapters for mounting a fluid pressure sensor and more particularly to such an adapter that has a selectively angularly orientable mounting surface for detachably supporting the fluid pressure sensor.

2. Description of Related Art

Pressure sensors are typically used in fluid flow or process systems to sense fluid pressure at one or more points in the system and transmit a signal correlative of the sensed pressure. For example, the pressure differential across a predefined orifice, commonly referred to as ΔP, is typically transmitted to a computer controlled data acquisition system which uses the sensed pressures in the calculation of system flow rates. It is also often desirable to separately measure the static pressure of the fluid, typically the pressure on the upstream side of the orifice. For such purposes, a static pressure transmitter is connected to a port that is in fluid communication with the corresponding pressure line. Such ports have, heretofore, often been difficult to access and did not provide any selectivity with respect to angular orientation, or placement, of the static pressure transmitter.

Also, it has been found that very small errors in the measured value of the respective pressures can produce significant errors in calculated fluid flow rates. Both static and differential pressure values are required to in the calculation of fluid flow rates. It is therefore desirable that the static pressure transmitter be placed as close to the ΔP transmitter as possible to minimize errors attributable to transient pressure fluctuations.

The present invention is directed to overcoming the problems set forth above. It is desirable to have an adapter for mounting a static pressure transmitter in immediate proximity with a ΔP pressure transmitter. It is also desirable to have a adapter that has a mounting surface for the static pressure transmitter which can be selective oriented in a desired angular direction to permit installation in confined or limited access areas.

SUMMARY OF THE INVENTION

In accordance with one aspect of the present invention, an adapter having a construction suitable for interposition between a manifold and a first test instrument and detachably supporting a second test instrument having a single inlet port, includes a stationary bar, a rotatable body detachably connected to an end portion of the stationary bar, and a means for securing the rotatable body in a predetermined angular relationship with respect to the stationary body and simultaneously providing a stabilized sealed connection between the rotatable body and the stationary bar. The stationary bar has at least two primary flow passageways arranged to provide fluid communication between respective predefined ports of the manifold and the first test instrument, an outlet port defined in an extended end portion of the bar, and an internal passageway providing fluid communication between a preselected one of the primary flow passageways and the outlet port in the end portion of the bar. The rotatable body has an outlet port defined on a selectively orientable surface that can be positioned at a desired angular position with respect to the stationary bar, an internal passageway providing fluid communication between the outlet port defined in the end portion of the stationary bar and the outlet port defined in the angularly orientable surface of the rotatable body, and a valve disposed in the body at a position whereat the valve is capable of selectively blocking fluid flow through the internal passageway in body.

In other aspects of the present invention, the end portion of the stationary bar of the adapter has a first set of external threads formed proximate an outer end of the end portion and arranged to be threadably received within a threaded pocket provided in the rotatable body, and a second set of external threads formed inwardly from the outer end of the end portion of the bar which have a diameter greater than that of the first set of external threads. Alternatively, the first and second sets of external threads formed inwardly from the outer end of the bar may have the same diameter. Furthermore, the means for securing the rotatable body in a selected angular relationship with respect to the stationary bar and simultaneously providing a stabilized sealed connection between the rotatable body and the stationary bar includes a nut having internal threads adapted to engage the second set of external threads on the end portion of the bar and a face surface capable of being aligned in forced abutment against the rotatable body when the angularly orientable surface of the rotatable body is selectively positioned in a desired angular relationship with respect to the stationary bar.

BRIEF DESCRIPTION OF THE DRAWINGS

FIG. 1 is an elevational view of the adapter embodying the present invention, with significant portions broken away to show internal features of the adapter;

FIG. 2 is top view of the adapter embodying the present invention;

FIG. 3 is an end view adapter embodying the present invention;

FIG. 4 is a sectional view of a portion of the adapter embodying the present invention, showing details of an alternate connection between stationary and rotatable components of the adapter; and FIG. 5 is a sectional view of a portion of the stationary component of the adapter embodying the present invention showing an alternate arrangement of the primary flow passages through the stationary component.

DESCRIPTION OF THE PREFERRED EMBODIMENT

An adapter embodying the preferred embodiment of the present invention is identified in the drawings by the reference numeral 10, and comprises three primary components: a stationary bar 12 constructed to be positioned between a manifold and a first test instrument, neither of which are shown; a rotatable body 14 detachably connected to the stationary bar 12; and a means 16 for securing the rotatable body 14 in a selected angular relationship with respect to the stationary bar 12 and simultaneously providing a stabilized sealed connection between the rotatable body 14 and the bar 12.

In the preferred embodiment of the present invention, the stationary bar 12 is advantageously fabricated from square bar stock. Although less desirable from a manufacturing cost aspect, the stationary bar 12 could also be formed of a rectangular or other shape having opposed flat surfaces, such as a plate. In whichever configuration, the bar 12 has a first surface 18 adapted, preferably my fine grinding, to mate with the instrument mounting surface of a manifold having a pair of outlet ports spaced apart by a first predetermined distance, for example 2.125 in (54 mm). As best shown in FIG. 1, the first surface 18 of the stationary bar 12 has a first inlet port 20 and a second inlet port 22 that are spaced apart at the aforementioned first predetermined distance of the outlet ports of the mating manifold surface. In similar fashion, the stationary bar 12 has a second surface 24 adapted to mate with the aforementioned first test instrument which typically is a ΔP pressure transmitter. Such transmitters have a pair of inlet ports disposed at a second spaced apart predetermined distance which may, or may not, be the same distance as the first predetermined distance of the manifold outlet ports. The second surface 24 has a first inlet port 26 and a second inlet port 28 spaced apart at the aforementioned second predetermined distance of the outlet ports defined in the mating surface of the test instrument. The stationary bar 12 also has a first primary flow passageway 30 providing fluid communication between the first inlet port 20 and first outlet port 26, and a second primary flow passageway 32 providing fluid communication between the second inlet port 22 and the second outlet port 28. If the first and second predetermined distances are equal, i.e., if the outlet ports in the manifold and the inlet ports in the test instrument are spaced apart by the same distance, the respective inlet ports 20,22, outlet ports 26,28, and corresponding primary flow passageways 30,32 will be vertically aligned as illustrated in FIG. 1. However, if the inlet ports of the test instrument are more closely spaced than outlet ports in the manifold, the respective inlet ports 20,22, outlet ports 26,28, and corresponding primary flow passageways 30,32 will be vertically angled, as shown in FIG. 5. Thus, in this latter arrangement, the stationary bar 12 further serves as a port spacing transition member providing fluid connection between components with nonaligned ports.

The stationary bar 12 has an end portion 34 which, in the preferred embodiment of the present invention, has a first set of external threads 36 formed near the outer, or distal, end of the end portion 34, and a second set of internal threads 38 formed at a greater diameter at a position inwardly from the outer end of the end portion 34. Alternatively, the first set 36 and second set 38 of external threads formed at the distal end of the end portion 34 may have the same diameter and thread form. An outlet port 40 is formed in the outer end of the end portion 34 and is placed in fluid communication with the first primary flow passageway 30 by an internally disposed elongated passageway 42 extending between the outlet port 40 and the first primary flow passageway 30.

The rotatable body 14 of the adapter 10 has a flanged mounting surface 44 arranged to detachably support a second test instrument, such as a static pressure transmitter, not shown. Importantly, as will be described later in more detail, the mounting surface 44 of the rotatable body 14 can be selectively positioned in a desired angular orientation with respect to the stationary bar 12, and has an outlet port 46 formed therein at a position arranged to align with the inlet port of the second test instrument when the second instrument is mounted on the surface 44. The rotatable body 14 also has an internally threaded pocket 48 formed in one side of the body 14 that is adapted to receive the first set of external threads 36 formed on the end portion 34 of the stationary bar 12. An internally disposed fluid passageway 50, extending laterally from the threaded pocket 48, through a closeable valve pocket 51, and thence upwardly to the outlet port 46, provides fluid communication between the threaded pocket 48 and the outlet port 46. When the rotatable body 14 and stationary bar 12 are interconnected, by engagement of the respective first set of external threads 36 with the internal threads of the threaded pocket 48, the first primary flow passageway 30 will, by way of the elongated passageway 42 and the internal passageway 50, be in direct fluid communication with the outlet port 46 in the angularly orientable surface 44.

As shown in FIG. 1, a blocking valve 52 is disposed within the rotatable body 14 at a position whereat it can block fluid flow through the internal passageway 50 in response to closing the valve and, accordingly, prevent the transmission of fluid pressure between the first primary flow passageway 30 and the outlet port 46. Desirably, a threaded test port 54 is also provided in the rotatable body 14 whereby a known test pressure can be directed to the inlet port of the static pressure transmitter for calibration purposes. A short passageway 56, offset from a narrowed lower section of the internal passageway 42, directly interconnects the test port 54 with the outlet port 46 by way of the upper portion of the internal passageway 42. The test port 54, when not in use, is sealed by a conventional threaded plug 58.

The means 16 for securing the rotatable body 14 in a selected angular relationship with respect to the stationary bar 12 and simultaneously providing a stabilized sealed connection between the rotatable body 14 and the bar 12 comprises a threaded nut 60 that is sized to threadably engage the second set of external threads 38, which preferably are standard screw threads, formed on the end portion 34 of the bar 12. Importantly, the threaded nut 60 has a planar face surface 62 that can, by rotation of the nut 60 in a counterclockwise direction after positioning the body 14 in a desired orientation, be brought into tight forced abutment with the side surface of the rotatable body 14. The forced abutment of the face surface 62 of the nut 60 against the rotatable body 14 maintains the rotatable body 14 at its selected angular position and stabilizes the threaded and sealed connection between rotatable body 14 and the stationary bar 12.

The first set 36 and second set 38 of external threads preferably comprise either NPT (National Pipe Tapered) threads or straight threads. If the first set 36 and second set 38 of external threads have the same diameter, both sets of threads should also have the same thread form and pitch, preferably straight threads, to permit assembly of the nut 60 over the first set of threads 36. If straight threads are used, a bore 64 is preferably provided in the bottom of the threaded pocket 48 in the body 14, and a mating cylindrical surface 66 is formed on the distal end of the end portion 34 of the stationary bar 12, as shown in FIG. 4. The interface between the bore 64 and the cylindrical surface 66 is sealed by an O-ring 68 disposed in a groove formed at an intermediate position along the cylindrical surface 66. Tapered threads are generally self-sealing, but may use a selected sealing compound, tape, or other sealing aid to further assure positive sealing of the threaded joint. Regardless of which thread configuration is used, the forced abutment of the face surface 62 of the nut 60 against the body 14 biases the respective internal and external threads of the connection into a more rigid engagement, maintains the rotatable body 14 at a selected angular orientation with respect to the stationary bar 12, and provides resistance against relative movement between the body 14 and bar 12.

The outlet ports 26,28,46 of the adapter 10 are preferably sealed by O-rings 70 disposed in grooves in the respective surfaces 24,44 of the adapter 10. The inlet ports 20,22 formed in the lower surface 18 of the bar 12 are preferably sealed by O-rings seated in a groove in the mating manifold surface.

The adapter 10 is installed by positioning the stationary bar 12 between the surface of an instrument flange of a manifold, such as a five valve manifold, and the mounting surface of a multiple port test instrument, such as a ΔP pressure transmitter. The stationary bar 12 is secured in the interposed position between the manifold and test instrument by bolts that extend upwardly through the instrument flange of the manifold, past the front and rear external surfaces of the stationary bar 12 which, as best shown in FIG. 2, have indentations 72 formed therein to provide clearance for the bolts, and then further extend either into the body or through the flange of the test instrument. Upon tightening of the mounting bolts, the stationary bar is securely captured between the manifold and test instrument with the respective aligned ports in separately sealed communication with each other.

After mounting of the stationary bar 12 between a manifold and first test instrument, the locking nut 60 is threaded onto the second set of threads 38 and rotated in a clockwise direction, as viewed from the end portion 34, until the nut 60 is spaced away from the outer end of the end portion 34, The threaded pocket 48 of rotatable body 14 is then threaded onto the first set of threads 36 provided on the end portion 34 of the bar 12 until snug, i.e., the body 14 is tightly engaged with the bar 12. If, at that resultant position, the mounting surface 44 is not in the desired angular orientation, the rotatable body 14 is further rotated a small amount in either a clockwise or counterclockwise direction until the desired orientation is achieved. When the mounting surface 44 of the body 14 is at its desired position, the prepositioned locking nut 60 is rotated counterclockwise and brought into tight abutment with the rotatable body 14. As described above, the forced abutment of the face surface 62 of the nut 60 against the body 14 biases the respective internal and external threads of the connection into rigid engagement, maintains the rotatable body 14 in the selected angular orientation with respect to the stationary bar 12, and prevents relative movement between the body 14 and bar 12. After tightening the locking nut 60 against the body 14, a static pressure transmitter may be mounted on the angularly oriented mounting surface 44 by a plurality of bolts 74, indicated by dashed lines in FIG. 3, that extend through the flanged mounting surface 44 and engage internal threads provided in the static pressure transmitter. Alternatively, the static pressure transmitter may be mounted to the angularly orientable mounting surface 44 prior to angularly positioning the mounting surface 44 and locking the rotatable body 14 to the stationary bar 12.

Other aspects, features and advantages of the present invention can be obtained from a study of this disclosure along with the appended claims.

What is claimed is:

1. An adapter having a construction suitable for interposition between a manifold and a first test instrument and detachably supporting a second test instrument having a single inlet port, said adapter comprising:

a stationary bar having at least two primary flow passageways arranged to provide fluid communication between respective predefined multiple ports of the manifold and the first test instrument when the adapter is interposed the manifold and the first test instrument, an end portion having an outlet port defined therein, and an elongated internal passageway providing fluid communication between a preselected one of said primary flow passageways and the outlet port defined at the end portion of said stationary bar;

a rotatable body detachably connected to the end portion of said stationary bar and having an outlet port disposed in a selectively angularly orientable mounting surface, an internal passageway providing fluid communication between the outlet port defined in the end portion of the stationary bar and said outlet port disposed in the angularly orientable mounting surface of the body, and a valve operatively disposed in said body at a position at which the valve is capable of selectively blocking flow through the internal passageway in said body; and means for securing said rotatable body in a selected angular relationship with respect to said stationary bar and simultaneously providing a stabilized sealed connection between the rotatable body and said stationary bar.

2. An adapter, as set forth in claim 1, wherein the end portion of said stationary bar has a plurality of external threads formed thereon, and the rotatable body has a threaded pocket adapted to receive the threaded end portion of the stationary bar.

3. An adapter, as set forth in claim 2, wherein the end portion of said stationary bar has a first set of external threads formed proximate an outer end of the end portion and adapted to be threadably received within the threaded pocket of the rotatable body and a second set of external threads formed inwardly from the outer end of the end portion, and said means for securing said rotatable body in a selected angular relationship with respect to said stationary body and simultaneously providing a stabilized sealed connection between the rotatable body and the stationary bar includes a nut having internal threads adapted to engage the second set of external threads on the end portion of the stationary bar and a face surface capable of being aligned in forced abutment against the rotatable body when the angularly orientable surface of the rotatable body is selectively positioned in a desired angular relationship with respect to the stationary bar.

4. An adapter, as set forth in claim 3, wherein the first set of external threads formed on the end portion of the stationary bar are tapered pipe threads.

5. An adapter, as set forth in claim 3, wherein said first set of external threads and said second set of external threads formed on the end portion of the stationary bar are straight threads having have the same diameter and pitch.

6. An adapter, as set forth in claim 3, wherein the threaded pocket formed in the rotatable body has a smooth bore portion and the end portion of the stationary bar has a cylindrical surface formed adjacent the outer end of the end portion that is adapted to be received within the bore of the threaded pocket, said cylindrical surface of the end portion of the bar having a groove disposed therein, said adapter including a seal member disposed within said groove in sealing relationship between the cylindrical surface of the end portion of the stationary bar and the bore of the threaded pocket of the rotatable body, and said first set of external threads being straight threads formed on the end portion of the stationary bar at a position spaced inwardly from said cylindrical surface.

7. An adapter, as set forth in claim 1, wherein the manifold has a plurality of outlet ports spaced apart by a first predetermined distance, and said first test instrument has a plurality of inlet ports spaced apart by a second predetermined distance, said first and second predetermined distances being different distances.

8. An adapter, as set forth in claim 1, wherein said rotatable body has a sealable test port formed therein in fluid communication with the internal passageway in said body.

9. An adapter having a selectively angularly orientable mounting surface for detachably supporting a fluid pressure sensor, comprising:

a stationary bar having a first surface adapted to mate with an instrument mounting surface of a manifold having a pair of spaced apart outlet ports disposed therein, said first surface of the bar having a pair of spaced inlet ports disposed therein and adapted to be aligned with said pair of spaced outlet ports of said manifold when mounted on said manifold, a second surface adapted to mate with a manifold mounting surface of a test instrument having a pair of spaced apart inlet ports disposed therein, said second surface of the bar having a pair of spaced outlet ports disposed therein and adapted to be aligned with said pair of inlet ports of the test instrument when attached to said test instrument, a pair of primary flow passageways internally disposed within said bar with one passageway of said pair providing fluid communication between said first inlet port and said first outlet port of the stationary bar and the other passageway of said pair providing fluid communication between said second inlet port and said second outlet port of the bar, a threaded portion disposed at one end of said rectangular bar and having an outlet port formed therein, and an internally disposed elongated passageway providing fluid communication between a preselected one of said primary flow passageways and the outlet port at the threaded end portion of the bar;

a rotatable body having said selectively angularly orientable mounting surface for detachably supporting a fluid pressure sensor disposed thereon, an outlet port defined in said angularly orientable mounting surface, a threaded pocket for receiving the threaded end portion of said stationary bar, an internally disposed fluid passageway providing fluid communication between the threaded pocket and the outlet port of said angularly orientable mounting surface, and a valve operatively disposed in said body and adapted to selectively block fluid communication through said fluid passageway in the rotatable body; and a threaded nut adapted to threadably engage the threaded end portion of the stationary bar and forcibly abut the manifold body when said angularly orientable surface of the rotatable body is selectively positioned in a desired angular relationship with respect to said stationary bar.

10. An adapter, as set forth in claim 9, wherein the threaded portion disposed at one end of the stationary bar includes a set of tapered pipe threads.

11. An adapter, as set forth in claim 9, wherein the threaded pocket formed in the rotatable body has a smooth bore portion and the threaded end of the stationary bar has a cylindrical surface formed adjacent an outer end and adapted to be received within the bore of the threaded pocket and having a groove disposed therein, said adapter including a seal member disposed within said groove in sealing relationship between the cylindrical surface and the bore of the threaded pocket of the body, and said external threads being straight threads formed on the end portion of the stationary bar at a position spaced inwardly from said cylindrical surface.

12. An adapter having a selectively angularly orientable mounting surface arranged for detachably supporting a fluid pressure sensor, comprising:

a stationary bar having a first surface adapted to mate with an instrument mounting surface of a manifold having a pair of outlet ports spaced apart by a first predetermined distance, said first surface of the bar having first and second inlet ports disposed therein in spaced apart relationship at said first predetermined distance, a second surface adapted to mate with a test instrument having a pair of inlet ports spaced apart at a second predetermined distance different from said first distance, said second surface of the bar having first and second outlet ports disposed therein in spaced apart relationship at said second predetermined distance, a first primary flow passageway internally disposed within said bar and providing fluid communication between said first inlet port and said first outlet port of the bar, a second primary flow passageway internally disposed within said bar and providing fluid communication between said second inlet port and said second outlet port of the bar, a threaded portion disposed at one end of said rectangular bar and having an outlet port formed therein, and an internally disposed elongated passageway providing fluid communication between a preselected one of said primary flow passageways and the outlet port at the threaded end portion of the bar;

a rotatable body having said selectively angularly orientable mounting surface arranged for detachably supporting a fluid pressure sensor disposed thereon, an outlet port disposed in said angularly orientable mounting surface, a threaded pocket having internal threads arranged to threadably receive the threaded end portion of said stationary bar, an internally disposed fluid passageway providing fluid communication between the threaded pocket and the outlet port of said angularly orientable mounting surface, and a valve operatively disposed in said body to selectively block fluid communication between said preselected one of the primary flow passages in said stationary bar and the outlet port defined on the angularly orientable surface of the rotatable body when the threaded end portion of said stationary bar is threadably engaged in the threaded pocket of the rotatable body; and a threaded nut adapted to threadably engage the threaded end portion of the stationary bar and forcibly abut the manifold body when said angularly orientable surface of the rotatable body is selectively positioned in a desired angular relationship with respect to said stationary bar.

* * * * *